UNITED STATES PATENT OFFICE.

JACOB E. BLOOM, OF NEW YORK, N. Y.

CACAO PRODUCT AND PROCESS OF MAKING SAME.

No. 837,782.  Specification of Letters Patent.  Patented Dec. 4, 1906.

Application filed August 1, 1904. Serial No. 219,105.

*To all whom it may concern:*

Be it known that I, JACOB E. BLOOM, a citizen of the United States, residing at New York, in the county of New York and State of New York, have invented certain new and useful Improvements in Cacao Products and Processes of Making Same; and I do declare the following to be a full, clear, and exact description of the invention, such as will enable others skilled in the art to which it appertains to make and use the same.

This invention relates to cacao products—such as chocolate, cocoa, and cacao-butter—and preparations thereof and to the processes of producing the same, and has for its principal aim the provision of a process whereby the resulting product will be more readily digested, absorbed, and assimilated by the human system, and for a further object the provision of a product of the kind stated having a fat content which will be most readily digested, absorbed, and assimilated by the human system and whereby the energy now wasted in the digestion of the fat content of cacao products as now constituted will be rendered available for concentration upon the digestion of the remaining food.

Chocolate and cocoa are made from the "beans" or seed of several small trees, natives of tropical America, of which *Theobroma cacao L.* is by far the most important.

The first stages in the manufacture of both chocolate and cocoa are the same. After removing stones, chips, and other impurities the beans are roasted, thus developing a desirable flavor and facilitating the processes of separation from the shells and grinding. The beans are then crushed by machinery and separated from the shells. In some factories the "germs" (rootlets) are also removed. The broken cotyledons, free from shells and known as "cocoa-nibs," are next ground in the chocolate-mill. The heat of grinding melts the fat, which makes up about half the weight of the nibs, and the ground product runs out of the mill as a thin paste. This paste after cooling in molds is the unsweetened chocolate of commerce. Sweet chocolate is prepared by mixing pulverized sugar and vanilla or other flavor with the warm chocolate paste before molding.

Cocoa is prepared by removing a portion of the fat from the warm mass by pressure and reducing the residue to a powder, with or without addition of vanilla flavor. "Dutch-process" cocoa is cocoa treated with an alkali, usually soda or ammonia, with a view of preventing the collecting of fat on the surface of a beverage prepared therefrom. This is sometimes called "soluble cocoa." Cacao-butter is the expressed fat obtained as a by-product in the manufacture of cocoa.

The present invention is founded upon the discovery that the more nearly a fat or oil supplied to the human system approximates in the proportions of the olein, palmitin, and stearin in its fat content the proportions of the like proximate constituents in the human fat the more readily is the same absorbed, digested, and assimilated. Of any fat eaten by man only the proportion of olein, palmitin, and stearin found in that of the human fat will be assimilated, and any excess of such elements is not only a waste, but entails upon the system the burden of expelling the same, whereby the digestion of the remainder of the food preparation is impeded.

The fat content of cocoa, chocolate, and cacao-butter is not analogous in respect of the proportions of its olein, palmitin, and stearin to the like proximate principles or elements of human fat, and in the methods hitherto practiced in the production of said articles no attempt has been made to give the fat constituent thereof a predetermined content of olein, palmitin, and stearin analogous to that of human fat.

The object of my invention is obtained by modifying the composition of the oil or fat of cocoa, chocolate, confectionery, cacao-butter, and other cocoa products as regards the proportions of its olein, palmitin, and stearin content, so as to make the proportions of the same in the finished edible product approximate the proportions of the like proximate constituents found in human fat.

The human fat in some cases has been found to comprise in adults 86.21 per cent. olein, 7.85 per cent. palmitin, 1.93 per cent. stearin, (or proportions 89.83:8.16:2.01) and in a child 65.04 per cent. olein, 27.81 per cent. palmitin, 3.15 per cent. stearin, (or proportions 67.75:28.97:3.28.) Such percentages and proportions may be found to vary for different ages and conditions of man. The scope of my invention covers any such variations, for I do not restrict myself to the aforesaid specific proportions, which are merely cited as examples and to aid in an understanding of the principle and advantages of the invention.

The native cacao-bean, as also commercial cocoas, vary in the percentages of the fat content. In the bean or nib it varies from 36.8 to 50.9 per cent. I take the average of fat in the cocoa-nib used by me at fifty per cent., in average commercial cocoa or chocolate at twenty-five per cent., and the composition of the average fat of cacao-beans I find includes or comprises about thirty per cent. olein and seventeen per cent. palmitin and forty per cent. stearin. In manufacturing in quantity I not only ascertain approximately the percentage of total fat in the cacao-bean, but also the approximate composition as regards olein, palmitin, and stearin of such fats.

In my invention there is incorporated with the cocoa or chocolate mass an oil ingredient or compound oil having a known content of olein, palmitin, and stearin which when added to the duly-ascertained oil in the cocoa or chocolate shall constitute the same approximately of the predetermined oil formula aforesaid.

Method A: In the practice of my process I can incorporate or mix the said ingredient or compound oil with the hot thin cocoa paste or mass as it runs from the ordinary cocoa or chocolate mill on first grinding the cocoa nibs or seeds and thereafter express or otherwise remove from the whole mixture any desired amount of the new product oil which forms my new cacao butter or fat and in amount requisite to reduce the amount of oil or fat remaining in the cocoa or chocolate product either to the amount as now commonly preferred or any other desired amount. The aforesaid expressed oil, as also the oil in the cacoa, is of the predetermined oil formula.

Method B: I prefer, however, this method, wherein I first express from said hot cocoa paste any amount, preferably about seventy-five per cent. to ninety per cent., of its native oil, as now practiced in the manufacture of commercial cocoa, and thereupon add and incorporate in the remaining paste my aforesaid compound in amount duly calculated to give in the product the composition aforesaid, and, if desired, I may make a second expression of excess fat from such newly-mixed paste to attain a dry remaining product which can be pulverized, if desired. The cacao-butter first expressed in this form of the process is utilized by adding or incorporating with it a due amount of my compound oil to constitute it of the predetermined formula, thus making it a form of my improved cacao-butter. The second pressing aforesaid is of the said formula.

Though I prefer to incorporate my compound oil as aforesaid, especially when I manufacture the cocoa or chocolate from the nibs or seed, yet I do not restrict myself thereto, but can and do also treat and modify the commercial cocoas and chocolates of any manufacture by incorporating and mixing therewith while the same is in a finely-pulverized state my compound oil in duly-calculated amount and expressing excess oils from the resulting mass.

As examples applicable to either Method A or Method B and of my methods of modifying the fat of cocoa to constitute the fat therein as regards its olein, palmitin, and stearin content of approximately the proportions of the like proximate constituents of human fat I cite the following examples, wherein the figures pertain to any one unit—such as pound or ounce or gram or other unit or prorate amounts—to wit:

Example 1: To modify the fat of or in cocoa or chocolate to approximate the adult-oil formula for each unit of fat in the native cacao, to wit:

|   |   | Olein. | Palmitin. | Stearin. |
|---|---|---|---|---|
| 1 | Cacao fat, comprising | .3 | .17 | .4 |

I mix a compound oil comprising—

| 95 | Olein No. 1, comprising | 88.36 | 4.02 | 1.05 |
|---|---|---|---|---|
| 4⅔ | Olive-oil palmitin, comprising | .34 | 4. | 0 |
| 100⅔ | Total, comprising | 89. | 8.19 | 3.05 | being the approximate proportions of olein, palmitin, and stearin in adult human fat.

Example 2: To modify the fat of or in the cocoa or chocolate to approximate the child-oil formula for the units of fat in the native cacao or pro rata amounts, to wit:

|   | Olein. | Palmitin. | Stearin. |
|---|---|---|---|
| 3 cacao fat, comprising | .9 | .51 | 1.2 |

I mix a compound oil of—

| 70 | Olein No. 1, comprising | 65.78 | 3 | 1.28 |
|---|---|---|---|---|
| 29 | Cotton-seed palmitin, comprising | 1.45 | 25.23 | .87 |
| 99+3 | Total, comprising | 68.13 | 28.74 | 3.3 | being approximately the proportions of olein, palmitin, and stearin found in child fat.

Example 3: To modify the fat of or in cocoa or chocolate to approximate the child-oil formula for the units of fat in the native cacao or pro rata amounts, to wit:

|   | Olein. | Palmitin. | Stearin. |
|---|---|---|---|
| 5 cacao fat, comprising | 1.5 | .85 | 2. |

I mix a compound oil of—

| 70 | Olein No 1, comprising | 65.78 | 3. | 1.28 |
|---|---|---|---|---|
| 28 | Olive-oil palmitin | 1.4 | 25.20 | 0 |
| 98+5 | Total, comprising | 68.68 | 29.05 | 3.23 | being approximately the proportions of olein, palmitin, and stearin as found in child fat. In this example if I follow Method A, I add 19.6 units of my compound oil for each unit of native oil in the cacao. This total amount being excessive for consumption from the standpoint of a well-balanced food, I express from the resulting cocoa any desired amount. Thus if the native cacao contained fifty per cent. fat then for each one-pound cocoa, when the same is first expressed from the seed and while in a warm molten mass, I mix and incorporate by well-known means 19.6 × ½ pound = 9.6 pounds of my said compound oil, preferably by thoroughly mixing in an emulsionizing-machine or in a chocolate-mixer or mélangeur. I then filter or express therefrom in any suitable filter or press, preferably a centrifugal filter, the excess of oils until I have reduced the amount of oil remaining in the cocoa mass to any desired percentage. I prefer a remainder of about ten per cent. to attain a dry or pulverizable product, though I also in some forms permit about twenty-five per cent. to remain, thus constituting the amount in ordinary commercial cocoa; but modified, as aforesaid, and in other forms made by me I permit about fifty per cent. of oil to remain in the cocoa mass where such cocoa is to be used for making chocolate and where the public may prefer such; but in such case also the remaining cacao fat has been modified, as aforesaid. The said fifty per cent. of fat in cocoa is usually reduced to about twenty-five per cent. of the total chocolate, as the latter has a material amount of sugar in its composition, usually fifty per cent. of sugar.

In my preferred Method B, I first express from the cocoa paste the maximum amount of oil possible. I prefer a hydraulic press to press the paste kept at a temperature of about 140° Fahrenheit and to remove from each one pound of cocoa paste containing originally fifty per cent. of fat sufficient fat so that one pound of cocoa paste remaining shall contain ten per cent., or even less, of fat. To modify the latter, to each one pound of such paste containing one-tenth of a pound of cacao-oil I add (or with it I mix) $19.6 \times \frac{1}{10} = 1.96$ pounds of my said compound oil, (Example 3,) or approximately two pounds. I now have a cocoa paste of three pounds weight, whereof two pounds, or approximately so, (or about sixty-six and two-thirds per cent.,) is my improved oil of the predetermined child-oil formula. For use in making chocolate I express therefrom one-sixth of its weight of oil, thus reducing the same to fifty per cent. of oil. For use as cocoa I prefer to express sufficient oil until its oil content is reduced to twenty-five per cent. of the total weight. The oil expressed as aforesaid is of the predetermined oil formula. The aforesaid compound oils are prepared substantially as described in my patent application, Serial No. 198,364, filed March 14, 1904, excepting substituting the above compound oil formulas, respectively. The olive-oil palmitin is obtained from native olive-oil by subsidence and solidification of the solid fat in the olive-oil at a low temperature, preferably of about 45° to 50° Fahrenheit, and thereafter preferably filtering the liquid fats therefrom. The cotton-seed palmitin is likewise obtained from the cotton-seed stearin deposited by cold from refined winter-strained cotton-seed oil. The aforesaid olein No. 1 is an oil of lard and was pressed from choicest edible lard at a temperature of 45° Fahrenheit at a pressure of about one hundred and sixty pounds to the square inch. I do not restrict myself to the said native oils of fats to make my compound oil, nor to the said temperatures or methods of obtaining said fractions fats and any well-known methods, especially of native oils. I can use any edible oils or those indicated in aforesaid patent application, Serial No. 198,364.

In the manufacture of cocoa or chocolate confectionery I preferably attain my invention by using my improved cocoa or chocolate prepared as by the aforesaid methods, and where butter or other fat is ordinarily called for by the recipe for making such confectionery I preferably substitute a like amount of the new product fat or improved cocoa-fat obtained, as aforesaid. Thus, Example 4, an accepted recipe for "sweet chocolate," is sugar, five pounds; glucose, one and one-fourth pounds; fresh butter, one-half pound; pure cocoa unsweetened, one pound; essence of vanilla, one-fourth of an ounce. In my method of manufacture I substitute for said cocoa my improved cocoa prepared as aforesaid, and I substitute for said one-half pound of butter a like amount of my cocoa-butter or fat expressed as in Method A or prepared from the fat expressed as in Method B.

In the manufacture of chocolate or cocoa confectionery in my method I prefer to use in place of part of the sugar a quantity of honey, the amount being regulated by the degree of sweetness to be attained, whereby the fats more readily emulsify with water in the stomach and duodenum at and below the body temperature, thereby facilitating the digestion of the whole.

By "cocoa products" I include all forms of cocoa and chocolate, flavored or unflavored, and cocoa or chocolate cakes, confections, candies, and drinks, and what is called "soluble chocolate" used in making hot or cold soda-water drinks, and a preparation of cocoa-nibs and of cocoa with other nutritious substances with, or without flavors—such as vanilla or cinnamon and sweetening—and cocoa-butter, broma, &c. In other words, it is to be understood that the term "cocoa products" or "cacao products" applies to the various products of the beans or seeds from which chocolate and cocoa are produced. I use the term "fats" herein to include oils, and vice versa.

I apply an analogous method of preparing foodstuffs to increase the digestibility, absorbability, and assimilability to that herein specifically described for cacao-beans to other foodstuffs comprising invisible oils, more especially where the latter comprise excess of solid fats over that called for by the aforesaid adult or child oil formulas. This is notably the case in the ground pea or peanuts, which comprise about forty per cent. of fat and whereof over seven per cent. is stearin. In all such foodstuffs I prefer first to remove the excess of stearin over that required by the oil formula by expressing or otherwise removing a material amount of the oil from the foodstuff and then modify the oil in the remainder as per the method described for cacao aforesaid. In a prior application filed by me January 15, 1903, Serial No. 139,201, I have claimed sundry improvements in food preparations under or upon which this is a further improvement in and of a particular species, and I do not claim the former herein.

Having thus described the invention, what I claim as new, and desire to secure by Letters Patent, is—

1. The process of treating cacao materials to produce an improved cacao product, which comprises the step of producing a paste or mass of said materials and adding to the fat constituent thereof a fat which gives said constituent a predetermined content of olein, palmitin, and stearin analogous to that in which said proximate principles are found in human fat.

2. The process of treating cacao materials to produce an improved cacao product, which comprises the steps of producing a paste or mass of said materials, adding to the fat constituent thereof a fat which gives said constituent a predetermined content of olein, palmitin and stearin analogous to that in which said proximate principles are found in human fat, and expressing from said mass a portion of said fat.

3. The process herein described of treating cacao materials to produce an improved cacao product, consisting of the following steps: first, reducing the materials to a paste; second, removing therefrom a desired amount of its native oil or fat; third, incorporating with the residue an oil or fat which will give the fat constituent thereof a predetermined content of olein, palmitin and stearin analogous to that in which these proximate principles occur in human fat; and fourth, removing excess fat from the mass.

4. As a new article of manufacture a cacao product, having a fat constituent of a predetermined content, as regards its olein, palmitin and stearin analogous to that in which said proximate principles occur in human fat.

5. As a new article of manufacture, a cacao product in a dry condition, having a fat content comprising olein, palmitin and stearin in approximately the proportions in which these proximate principles occur in human fat.

6. As a new article of manufacture, a cacao product having a fat content comprising olein, palmitin and stearin in approximately the proportions in which these proximate principles occur in human fat, the said preparation being in a dry and pulverized condition.

In testimony whereof I affix my signature in presence of two witnesses.

JACOB E. BLOOM.

Witnesses:
 Jos. LILIENTHAL,
 HARRY J. LASK.